Sept. 25, 1962   B. H. PATZMAN ET AL   3,055,240

KNURLING TOOL

Filed Jan. 18, 1961

INVENTOR.
Benjamin H. Patzman
BY Harold L. Nagel

United States Patent Office 3,055,240
Patented Sept. 25, 1962

3,055,240
KNURLING TOOL
Benjamin H. Patzman, 1928 N. Erie St., and Harold L. Nagel, 2328 Olive St., both of Racine, Wis.
Filed Jan. 18, 1961, Ser. No. 83,415
1 Claim. (Cl. 80—5.1)

This invention relates to a knurling tool, its primary object being to provide specific means for positively holding opposed knurling rollers in fixed adjusted position and including automatically actuated means to swing such rollers away from contact with a work piece upon completion of a knurling operation on the work piece.

We are aware that there have been many types of knurling devices used in successful knurling operations. As far as the present applicants are aware, however, the withdrawing of the knurling tool from a complete work piece, has been time consuming and in many instances, has damaged the knurl in the work piece.

This invention, therefore, aims to provide a device for use in knurling a piece of work which comprises a pair of opposed and spaced knurling rollers in fixed position, and supported individually upon elongated levers straddling an elongated hollow shank which in turn supports a trigger assembly which automatically swings the levers apart at the ends mounting the rollers, whereby the rollers are disengaged from knurling contact with the work after the knurling has been completed. The work may then be withdrawn from between the knurling rollers without contact with the rollers.

Other objects and advantages of the invention will become apparent from the following detailed description of the preferred embodiment illustrated in the accompanying drawing in which.

Figure 1:
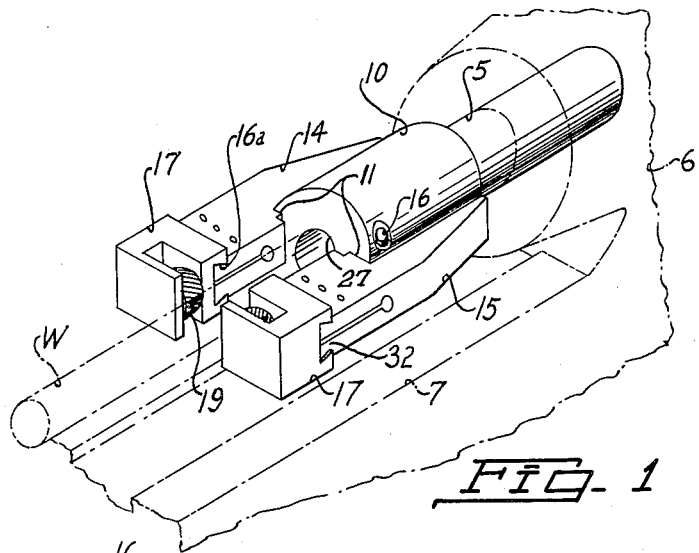
FIGURE 1 is a perspective view of a knurling tool embodying the features of the invention.

Referring now to the drawing for a better understanding of this invention, the knurling tool comprises generally, a rigid body including an elongated shank 5.

The shank 5, as herein shown, is of hollow construction and is suited for use in the turret 6 which is indexible about a horizontal axis to present different tools to the work and translatable on ways 7 toward and from a rotatably supported work piece W carried in a suitable collet (not shown). The turret is constructed to index the tool into a position of axial alinement with the work piece, and turret translation carries the tool into and out of working position with reference to the work. Suitable means, such as the usual guide or plate (not shown), which may be either fixed or adjustable is provided for actuating the tool to feed the knurling rollers against the sides of the work piece in response to the forward movement of a cross slide (not shown) carrying the guide.

In carrying out the invention, the shank 5 has extending from one end thereof, and integral therewith, a collar 10. Said collar 10 has oppositely disposed longitudinally extending slots 11 in line with oppositely disposed slots 12 formed in shank 5. These slots 12 communicate with the hollow interior 13 of the shank 5. The width of said slots 11 is greater than slots 12, and has mounted therein the reduced longitudinally extending guideway 4, in each instance, of a pair of elongated knurled supporting elements or levers 14 and 15, each pivotally mounted on a pin 16 extending cross-wise through the collar 10, with said levers straddling the collar 10. The levers 14 and 15 extend beyond the end of said collar 10 and have a portion of their top and bottom surfaces, dovetailed at 16a, to slideably and adjustably mount knurling roller housings 17. Mounted within the hollow interior 20 of said collar 10, is a trigger assembly 21. This trigger extends within the hollowed interior of the shank 5 and when the knurled rollers are in working position, a coil spring 25 is expanded and held therein by the opposite ends 22a of a pin 21a mounted cross-wise in the grooves 23. The ends of the pin 21a are balled and slide along the grooves 23, in the bottom surfaces of the levers 14 and 15.

Knurling rollers 19 are rotatably in opposed relationship in their respective housings 17 and each rotate about a pin 19a, which passes through the bifurcated ends 17a of said housings 17.

In operation, the tool is moved into operative relation to the workpiece W with the knurling rollers 19 alined with the axis of the workpiece W. As the knurling rollers 19 are alined or centered with respect to the work, it necessarily follows that the rollers engage the work piece at diametrically opposite points. The face 26 of the trigger assembly is spaced back a predetermined distance from the front opening 27 of the collar 10 to limit the amount of knurling to be done longitudinally over the surface of the work. As soon as the leading edge of the work pushes against the face 26 of the trigger assembly 21, the pin 21a moves back against the bias of the spring 25 and compresses the spring, with the pin sliding in the grooves 23 until the balled ends of the pin are released from the grooves 23 at the end 28 of the collar. The springs 29 nesting within apertures 30 of the collar 10 expand outwardly against the levers 14 and 15, forcing the knurling housings 17 on the levers, outwardly, with the levers 14 and 15, rotating on the pins 16. This movement releases the rollers 19 from contact with the work W sufficiently to retract the tool to inoperative position without interference between the knurling rollers and the work. Placing the knurling tool in operative position requires merely the simple function of manually forcing the sprung ends of the levers 14 and 15 against the springs 29 and compressing such springs in the apertures 30. The opposite ends of the levers are raised, permitting the coil spring 25 to expand and pushing the pin 21a into the grooves 23 and thus also putting the trigger assembly in cocked condition. The extreme forward position of the trigger assembly, as determined by the farthest advance of the face 26, is pre-set by the permitted forward position of the pin 21a in the end 23a of the grooves 23.

The penetration of the knurling rollers cutting through the outside surfaces of the work piece is predetermined by the space between the opposed knurling rollers. This spacing between the rollers may be changed by merely loosening the set screws 31 to manually move the housing 17 along the dove-tailed extensions 32 of the levers 14 and 15.

Figure 4:
FIGURE 4 is a detail view of a stop to be temporarily mounted in the face of the trigger assembly.
Figure 5:
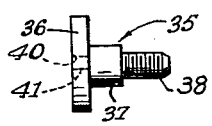
FIGURE 5 is a detail view of another form of stop to be temporarily mounted in the face of the trigger assembly.
Figure 2:
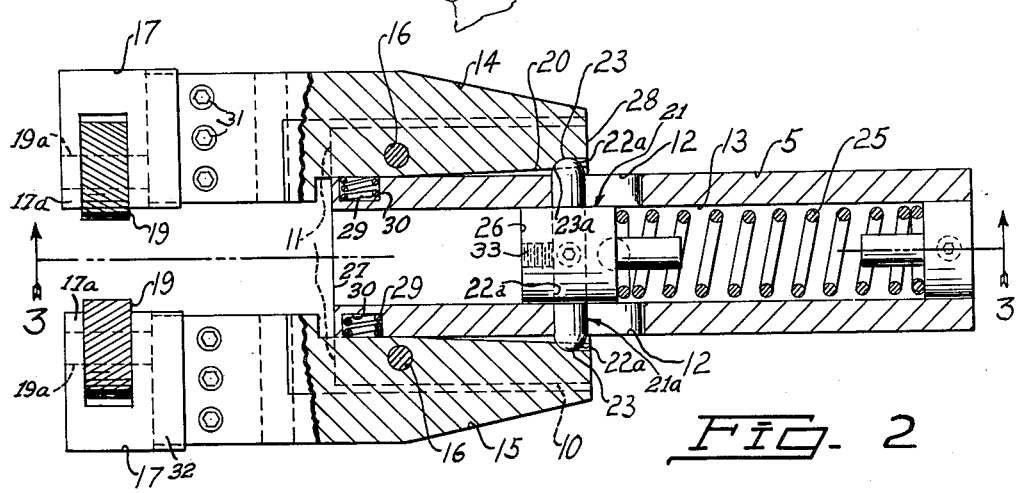
FIGURE 2 is a top plan view in section showing the position of the knurling rollers when positioned for knurling the surfaces of cylindrical stock on the line 3—3 of FIGURE 3.
Figure 3:
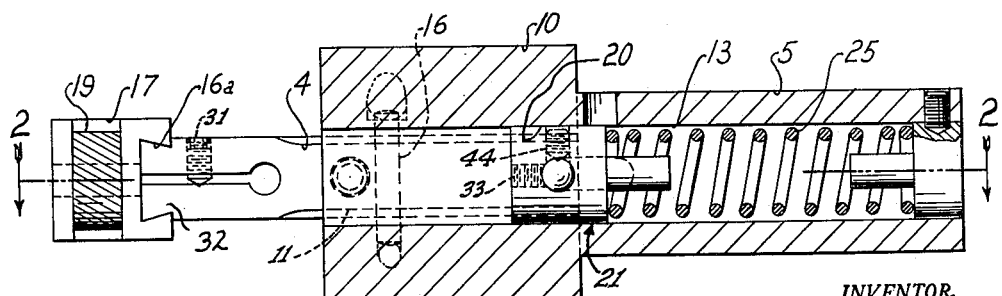
FIGURE 3 is a side view in section on the line 2—2 of FIGURE 2.

How far the work W travels within the collar 10 before moving against the trigger can be regulated by providing a threaded aperture 33, centrally located, in the face 26 of the trigger assembly. If a solid piece of work is to be knurled, a stop 34, of FIGURE 4, may be threaded in said aperture 33. The stem and head of such stop 34 extends a measured distance from the surface 26 of the trigger assembly. In this way, any member of different lengthed stops can be used. If it is found desirable to perform a knurling operation on hollowed tubular work pieces and the length of the knurl is different on runs of different lengths of tubes, we provide the stops 35 of FIGURE 5. These stops 35 comprise a disk 36 butting up against the shoulder of a stem 37 which is unthreaded but joined to a threaded portion 38 which can be threaded in aperture 33. The length of the stem 37 of stops 35 can be in various lengths and with the length selected can pre-determine the length of the knurl on any length of tubular work. The disk 36 may have a centered aperture 40 to pass over the reduced forward portion 41 of the stem, with perhaps the disk 36 temporarily snapping on said portion 41. In any event, the end of the work piece may contact the screw on the disk and function the same as the face 26 of the disclosure in FIGURE 2.

The opposite ends 22a of pin 21a are kept exactly the same distance from the outside surface of the shank 5. This is brought about by drilling a hole through the shank 5 and inserting the pin through the hole and securing it by set screw 44.

It will be apparent from the foregoing that the invention provides a knurling tool of novel and advantageous construction. By providing knurling rollers which may be sprung away from knurling engagement with a completed work piece, the applicants find a substantial amount of time is saved in the knurling of work pieces and the possible damage to completed knurled work pieces when withdrawing the knurled tool from the completed work piece, is eliminated.

We claim as our invention:

In a knurling tool, in combination, a rigid body comprising a hollow shank and a collar integral therewith, said shank having a pair of oppositely disposed slots, the slots in said shank being in communication with said hollow interior, a second pair of slots in the collar, a pair of elongated levers pivotally mounted on said collar and carried in the second pair of slots, said levers projecting beyond the front end of said collar, knurling rollers carried by said levers, said rollers spaced apart and adaptable for operating on work passing longitudinally therebetween and into said collar, spring members reacting between inner faces of said levers and the exterior of the collar tending to separate the front ends of said levers and accordingly, said rollers, each of said levers provided with a groove opposite the slots in said shank, a trigger assembly carried in said collar and the hollow interior of said shank and movable longitudinally therein, a pin carried cross-wise in said assembly having each end passing through the slots in said shank and engaging said grooves when said knurling rollers are in operative position, said work initially engaging said assembly and upon continued movement into said collar forcing said pin from said grooves along the slots in said shank whereupon said spring members separate said levers.

References Cited in the file of this patent

UNITED STATES PATENTS

| | | |
|---|---|---|
| 560,930 | Rau | May 26, 1896 |
| 574,162 | Prentice | Dec. 29, 1896 |
| 1,135,057 | Schultis | Apr. 13, 1915 |
| 1,153,345 | Schultis | Sept. 14, 1915 |
| 1,422,649 | Bach | July 11, 1922 |
| 2,453,722 | Moss | Nov. 16, 1948 |

FOREIGN PATENTS

| | | |
|---|---|---|
| 1,016,849 | France | Sept. 3, 1952 |